(12) United States Patent
Maharana et al.

(10) Patent No.: US 12,229,970 B2
(45) Date of Patent: Feb. 18, 2025

(54) FRAME RATE UP-CONVERSION USING OPTICAL FLOW

(71) Applicant: NVIDIA Corporation, Santa Clara, CA (US)

(72) Inventors: Aurobinda Maharana, Pune (IN); Karthick Sekkappan, Chennai (IN); Rohit Naskulwar, Maharashtra (IN)

(73) Assignee: NVIDIA Corporation, Santa Clara, CA (US)

( * ) Notice: Subject to any disclaimer, the term of this patent is extended or adjusted under 35 U.S.C. 154(b) by 106 days.

(21) Appl. No.: 17/888,185

(22) Filed: Aug. 15, 2022

(65) Prior Publication Data

US 2024/0054657 A1   Feb. 15, 2024

(51) Int. Cl.
*G06T 11/00*   (2006.01)
*G06T 7/215*   (2017.01)

(52) U.S. Cl.
CPC .............. *G06T 7/215* (2017.01); *G06T 11/00* (2013.01)

(58) Field of Classification Search
CPC . G06T 7/215; G06T 11/00; G06T 5/73; G06T 7/20; G06T 2207/20201; G06T 7/207; G06T 5/70; G06T 2207/20016; G06T 2207/10016; G06T 7/246; G06T 5/50; G06T 2207/20021; G06T 7/217; G06T 7/11; G06V 10/764; G06V 20/46; G06V 20/58; H04N 19/176; H04N 19/61; H04N 19/105; H04N 19/172; G09G 2320/106; G09G 2320/0261

See application file for complete search history.

(56) References Cited

U.S. PATENT DOCUMENTS

| | | | | |
|---|---|---|---|---|
| 2004/0022419 A1* | 2/2004 | Kesaniemi | .............. | G06T 7/269 382/107 |
| 2006/0291561 A1* | 12/2006 | Seong | .................. | H04N 19/527 375/E7.106 |
| 2015/0022677 A1* | 1/2015 | Guo | .................... | H04N 23/6811 348/208.1 |
| 2016/0021386 A1* | 1/2016 | Fishwick | ............. | H04N 19/577 375/240.16 |

\* cited by examiner

*Primary Examiner* — Xilin Guo
(74) *Attorney, Agent, or Firm* — Taylor English Duma L.L.P.

(57) ABSTRACT

In examples, when attempting to interpolate or extrapolate a frame based on motion vectors of two adjacent frames, there can be more than one pixel value mapped to a given location in the frame. To select between conflicting pixel values for the given location, similarities between the motion vectors of source pixels that cause the conflict and global flow may be evaluated. For example, a level of similarity for a motion vector may be computed using a similarity metric based at least on a difference between an angle of a global motion vector and an angle of the motion vector. The similarity metric may also be based at least on a difference between a magnitude of the global motion vector and a magnitude of the motion vector. The similarity metric may weigh the difference between the angles in proportion to the magnitude of the global motion vector.

20 Claims, 9 Drawing Sheets

FRAME RATE UP-CONVERSION USING OPTICAL FLOW

BACKGROUND

Frame Rate Up-Conversion (FRUC) refers to techniques for increasing the frame rate of a video by increasing the number of frames available for display over the same duration. Some popular FRUC techniques increase the number of available frames by using already rendered frames as a reference to generate the pixel data for one or more new frames, instead of using a full rendering pipeline. These new frames can be inserted as additional frames in the video to increase the total number of frames in a video. These FRUC techniques may use optical flow to recognize patterns of pixel behavior between the reference rendered frames based on the motion in a scene. These patterns can be used to predict pixel data in the pixels of the new frame by warping source pixels from the reference frames to generate the pixel data for pixels of the intermediate frame. When performing pixel warping, a collision may occur where multiple source pixels from the same or different reference frames are mapped to the same location for an intermediate frame—e.g., such as where the source pixels correspond to features (e.g., objects and object surfaces) located at different depths in an environment depicted in the frames. To produce a more realistic intermediate frame, these collisions should be resolved in order to reflect the relative depths of the source pixels in the intermediate frame.

Conventional approaches to resolving a collision between source pixels of reference frames may use depth values for the pixels to select the foreground pixel for the location in the intermediate frame. In some examples, the depth values are provided by a game-engine used to render the frames. However, accessing depth values from a game-engine require tight integration with the game-engine, which may not always be feasible or available. In other examples, the depth values may be generated using data corresponding to the frames themselves. However, generating depth values from frames may be computationally expensive and time intensive, which may hinder the ability to perform FRUC at real-time or near real-time rates.

SUMMARY

Embodiments of the present disclosure relate to using optical flow for collision resolution in frame rate up-conversion applications. In particular, the disclosure relates to approaches for determining whether to generate pixel data for a location in a frame using a pixel from another frame based at least on how similar a motion vector for the pixel is to a global motion vector computed using optical flow. Disclosed approaches may be used to resolve collisions between pixels of different source or reference frames when generating intermediate frames based at least on selecting the pixel—e.g., from the pixels associated with the collision—that has a motion vector that is less similar to the global motion vector.

In contrast to conventional approaches, such as those described above, disclosed approaches may generate pixel data for at least one location in one or more frames using one or more portions of one or more other frames based at least on a level of similarity between one or more global motion vectors and one or more motion vectors for the portion(s) of the other frame(s). A global motion vector for a frame(s) may be representative of motion for the overall frame(s). The level of similarity may be used to determine, for example, whether to generate pixel data for a location in an image using a pixel and/or a weighting for the pixel for a location in a frame. The level of similarity may be computed (in one or more embodiments) as a similarity score using a similarity metric based at least on a difference between one or more angles of the global motion vector(s) and one or more angles of the motion vector(s) corresponding to the one or more portion(s). Additionally, or alternatively, the similarity metric may be based at least on a difference between one or more magnitudes of the global motion vector(s) and one or more magnitudes of the motion vector(s) corresponding to the one or more portion(s). The similarity metric may weigh the difference between the one or more angles in proportion to the magnitude(s) of the global motion vector(s).

BRIEF DESCRIPTION OF THE DRAWINGS

The present systems and methods for using global motion for collision resolution in frame rate up-conversion are described in detail below with reference to the attached drawing figures, wherein.

DETAILED DESCRIPTION

Figure 1:
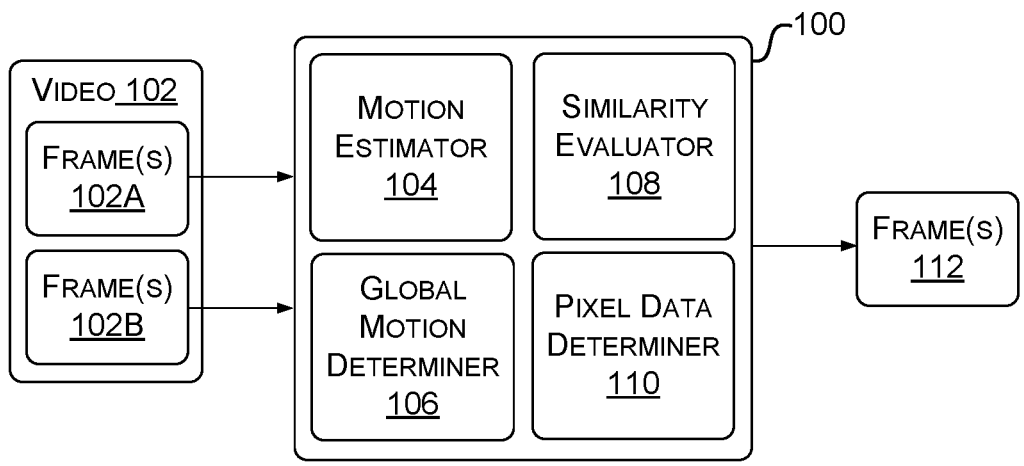
FIG. 1 depicts an example of a frame generation system, in accordance with some embodiments of the present disclosure.

The present disclosure relates to using global motion for collision resolution in frame rate up-conversion. In particular, the disclosure relates to approaches for determining whether to generate pixel data for a location in a frame using a pixel from another frame based at least on how similar a motion vector for the pixel is to a global motion vector. Disclosed approaches may be used to resolve collisions between pixels of different frames based at least on selecting the pixel that has a motion vector that is less similar to the global motion vector.

Disclosed approaches may generate pixel data for at least one location in one or more frames using one or more portions of one or more other frames based at least on a level of similarity between one or more global motion vectors and one or more motion vectors for the one or more portions of one or more other frames. When a motion vector for a pixel is similar to a global motion vector for a frame, it may indicate the pixel depicts an object or surface in the background of the frame. Similarly, when a motion vector for a pixel is significantly different than a global motion vector for a frame, it may indicate the pixel depicts an object or surface in the foreground of the frame. Thus, the level of similarity may be used to determine, for example, whether to generate pixel data for a location in an image using the pixel and/or a weighting for the pixel for the location. For example, the pixel may be selected for the location over at least one other pixel based at least on determining a motion vector for the pixel is less similar to a global motion vector than a motion vector for the other pixel.

A global motion vector for a frame(s) may be representative of motion for the overall frame(s). In at least one embodiment, the global motion vector may be computed using motion vectors of the frame(s). For example, the global motion vector may be computed based at least on a statistical combination of the motion vectors. Examples of statistical combinations include an average, a mode, a median, and/or one or more other statistically derived values.

In at least one embodiment, the level of similarity for one or more portions of one or more frames may be computed as a similarity score using a similarity metric. The similarity metric may be based at least on a difference between one or more angles of the one or more global motion vectors and one or more angles of one or more motion vectors for the one or more portions. Additionally, or alternatively, the similarity metric may be based at least on a difference between one or more magnitudes of the one or more global motion vectors and one or more magnitudes of one or more motion vectors (e.g., local motion vectors) for the one or more portions. In at least one embodiment, the similarity metric may weigh the difference between the one or more angles in proportion to the one or more magnitudes of the one or more global motion vectors. For example, an angle difference may be given more weight as a magnitude of a global motion vector increases, and less weight as the magnitude decreases.

While disclosed approaches are primarily described as being used for Frame Rate Up-Conversion (FRUC), this is not intended to be limiting. For example, disclosed approaches may generally be used to evaluate one or more portions of one or more images for use in determining pixel data for one or more image locations (e.g., in a same or different image, for image interpolation, for image generation, for image modification, etc.). Additionally, while motion vectors are primarily described as examples of motion estimates, any suitable representations of motion estimates may be used.

The systems and methods described herein may be used for a variety of purposes, by way of example and without limitation, these purposes may include systems or applications for machine control, machine locomotion, machine driving, synthetic data generation, model training, perception, augmented reality, virtual reality, mixed reality, robotics, security and surveillance, autonomous or semi-autonomous machine applications, deep learning, environment simulation, data center processing, conversational AI, light transport simulation (e.g., ray tracing, path tracing, etc.), collaborative content creation for 3D assets, digital twin systems, cloud computing and/or any other suitable applications.

Disclosed embodiments may be comprised in a variety of different systems such as automotive systems (e.g., a control system for an autonomous or semi-autonomous machine, a perception system for an autonomous or semi-autonomous machine), systems implemented using a robot, aerial systems, medial systems, boating systems, smart area monitoring systems, systems for performing deep learning operations, systems for performing simulation operations, systems implemented using an edge device, systems incorporating one or more virtual machines (VMs), systems for performing synthetic data generation operations, systems implemented at least partially in a data center, systems for performing conversational AI operations, systems for performing light transport simulation, systems for performing collaborative content creation for 3D assets, systems for generating or maintaining digital twin representations of physical objects, systems implemented at least partially using cloud computing resources, and/or other types of systems.

FIG. 1 depicts an example of a frame generation system 100 (also referred to herein as "system 100"), in accordance with some embodiments of the present disclosure. It should be understood that this and other arrangements described herein are set forth only as examples. Other arrangements and elements (e.g., machines, interfaces, functions, orders, groupings of functions, etc.) may be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by entities may be carried out by hardware, firmware, and/or software. For instance, various functions may be carried out by a processor executing instructions stored in memory.

The system 100 may be implemented using, among additional or alternative components, a motion estimator 104, a global motion determiner 106, a similarity evaluator 108, and/or a pixel data determiner 110.

As an overview, the motion estimator 104 may be configured to estimate motion between one or more frames, such as a frame(s) 102A and a frame(s) 102B of a video 102. The motion estimates (e.g., motion vectors) may include one or more motion estimates for one or more particular pixels and/or image portions (e.g., blocks) of the one or more frames. The global motion determiner 106 may be configured to determine one or more global motion estimates (e.g., global motion vectors) corresponding to the one or more motion estimates determined using the motion estimator 104. The similarity evaluator 108 may be configured to evaluate levels of similarity between one or more motion estimates for pixels and/or image portions (e.g., for the frame 102A and/or the frame 102B) determined using the motion estimator 104 and one or more global motion estimates determined using the global motion determiner 106. Pixel data determiner 110 may be configured to determine pixel data for one or more locations in a frame(s), such as a frame(s) 112, based at least on the evaluation of one or more levels of similarity performed using the similarity evaluator 108.

In at least one embodiment, the system 100 may be used for Frame Rate Up-Conversion (FRUC). According to one or more embodiments, a system or application of FRUC may use frames from the video 102, such as the frames 102A and 102B, to generate one or more intermediate or extrapolated frames of the video 102, an example of which includes the frame 112. For example, the pixel data determiner 110 may perform FRUC based at least on determining mappings between one or more image portions of the frame 102A and/or the frame 102B, and at least one location in the frame 112, so as to determine pixel data for the at least one location in the frame 112. As an example, the pixel data determiner 110 may generate pixel data (e.g., for one or more pixels) for a location using, at least in part, one or more portions of pixel data (e.g., for one or more pixels) mapped to that location. In one or more embodiments, the system 100 may generate the one or more intermediate or extrapolated frames of the video 102 based at least on a target framerate. For example, if the video 102 has a framerate of 30 frame per second (FPS), to reach a target framerate of 60 FPS, the system may generate an intermediate frame per pair of frames in the sequence of frames of the video 102. In at least one embodiment the target framerate may be user configurable.

Figure 2:
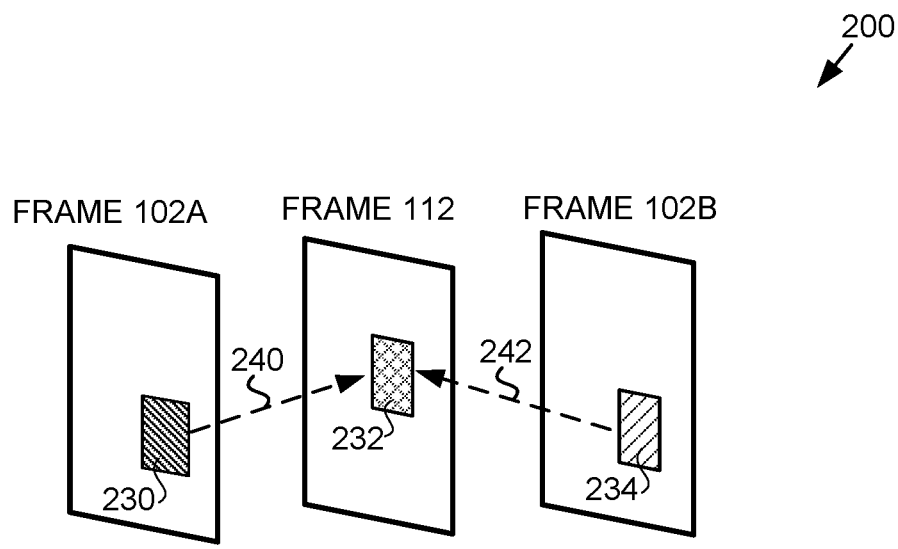
FIG. 2 illustrates an example of a collision between image portions, in accordance with some embodiments of the present disclosure.

Referring now to FIG. 2, FIG. 2 illustrates an example of a collision 200 between image portions 230 and 234, in accordance with some embodiments of the present disclosure. In at least one embodiment, the pixel data determiner 110 may determine a location for an image portion from the frame 102A that at least partially overlaps with a location that the pixel data determiner 110 determines for an image portion from the frame 102B, resulting in a collision (e.g., a pixel collision). For example, the pixel data determiner 110 may determine a location 232 (e.g., a pixel location) in the frame 112 for the image portion 230 (e.g., a pixel) and may determine the location 232 in the frame 112 for the image portion 234 (e.g., a pixel). When locations determined for image portions at least partially overlap, this may result in a conflict. For example, to generate pixel data for the frame 112 that accurately represents the environment, the pixel data determiner 110 may need to determine which image portion(s) to use for the pixel data and/or a weighting for image portion(s) used to generate the pixel data. In at least one embodiment, to do so, the pixel data determiner 110 may use one or more evaluations—performed using the similarity evaluator 108—for one or more of the image portions mapped to the location. The evaluation(s) may be of a level of similarity between one or more corresponding motion estimates and one or more global motion estimates. While the image portions 234 and 230 are shown as belonging to different frames, in at least one embodiment, the image portions 234 and 230 may correspond to the same frame.

Figure 3:
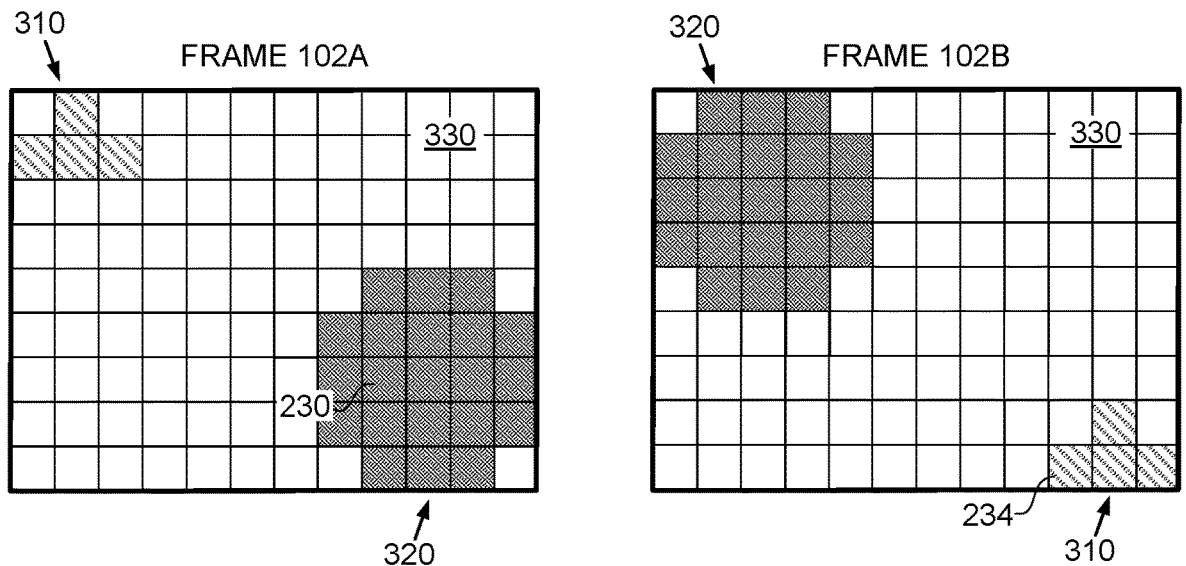
FIG. 3 illustrates examples of image content for frames and extrapolated frames which may be generated from the frames, in accordance with some embodiments of the present disclosure.
Figure 3:
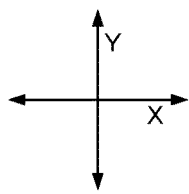
Figure 3:
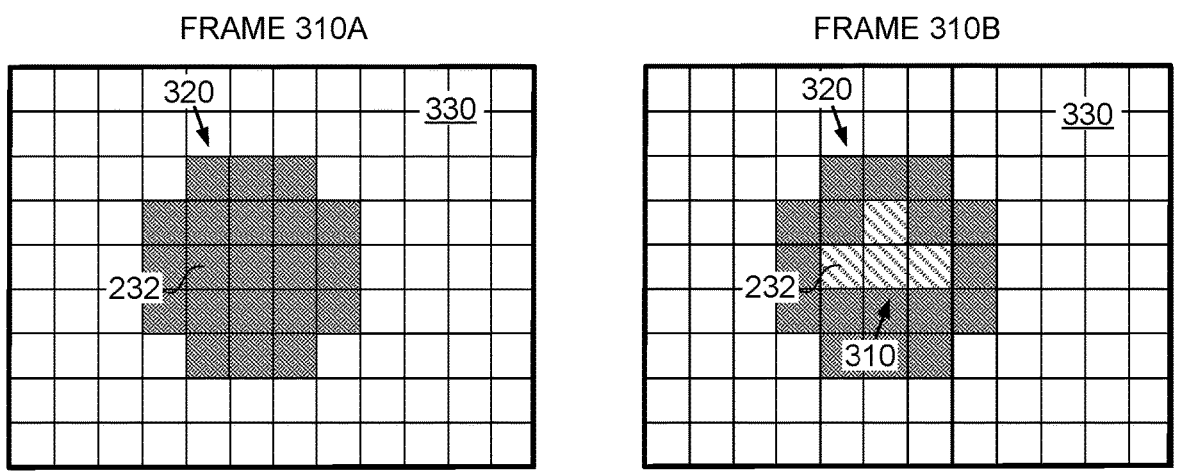

Referring now to FIG. 3, FIG. 3 illustrates examples of image content of the frames 102A and 102B and extrapolated frames 110A and 10B which may be generated from the frames 102A and 102B, in accordance with some embodiments of the present disclosure. Each block in FIG. 3 may represent one or more image portions (e.g., pixels) of an image.

FIG. 3 shows examples where the image content of the frames 102A and 102B includes an object 310 (or surface) and an object 320 (or surface) in front of (with respect to the camera perspective or viewport) a background 330. In at least one embodiment, the frame 102B is subsequent to (e.g., immediately or otherwise following) the frame 102A in the video 102. For example, the frame 102B may depict a state of an environment at a later time than the frame 102A. As indicated in FIG. 3, one or more of the objects 310 and 320 (or surfaces) may have moved with respect to the background 330. This movement may result in the pixel data determiner 110 detecting one or more collisions between image portions, such as the collision 200 of FIG. 2. As a global motion estimate may be representative of motion for a frame(s) (e.g., 50% or more), if image content of a frame is primarily the background 330, the global motion estimate may correspond to motion of the background 330. If an object is at or near the background 330, when a camera capturing the video 102 is panning, motion estimates corresponding to the object (or surface) may be similar to the global motion estimate corresponding to the background 330. The motion estimates may become more dissimilar as the object moves farther from the background 330. Similarly, if image content of a frame is primarily foreground, a global motion estimate may correspond to motion of the foreground. The pixel data determiner 110 may use these relationships in motion estimates to determine which image portions are closer or farther from the background or foreground when determining pixel data for a frame(s). Thus, for example, collisions of image portions may be resolved based at least on these relationships.

A frame 310A may correspond to the frame 112 where the pixel data determiner 110 selects the image portion 230 to use for the pixel data at the location 232 over the image portion 234. Additionally, or alternatively, the frame 310A may correspond to the frame 112 where the pixel data determiner 110 weighs the image portion 230 higher for the pixel data at the location 232 than the image portion 234. The frame 310A may result, for example, where the evaluation(s) performed using the similarity evaluator 108 indicates one or more motion estimates for the object 310 are more similar to one or more global motion estimates than one or more motion estimates for the object 320. For example, because image content of the frames 102A and 102B primarily includes the background 330, global motion for the frames may be the same as or similar to motion of the background 330. Thus, where the object 320 is in the foreground with respect to the object 310, motion estimates for the object 310 may be more similar to a global motion estimate than the object 320. As such, based on the higher similarity, the pixel data determiner 110 may select image portions for the object 320 over image portions for the object 310 to generate the frame 310A.

Similarly, a frame 310B may correspond to the frame 112 where the pixel data determiner 110 selects the image portion 234 to use for the pixel data at the location 232 over the image portion 230. Additionally, or alternatively, the frame 310B may correspond to the frame 112 where the pixel data determiner 110 weighs the image portion 234 higher for the pixel data at the location 232 than the image portion 230. The frame 310B may result, for example, where the evaluation(s) performed using the similarity evaluator 108 indicates one or more motion estimates for the object 320 are more similar to one or more global motion estimates than one or more motion estimates for the object 310. For example, as described herein, because image content of the frames 102A and 102B primarily includes the background 330, global motion for the frames may be the same as or similar to motion of the background 330. Thus, where the object 310 is in the foreground with respect to the object 320, motion estimates for the object 320 may be more similar to a global motion estimate than the object 310. As such, based on the higher similarity, the pixel data determiner 110 may select image portions for the object 310 over image portions for the object 320 to generate the frame 310B.

As described herein, the motion estimator 104 may be configured to estimate motion between one or more frames, such as the frame(s) 102A and the frame(s) 102B of a video 102 (or more generally a sequence of frames or images). The motion estimates (e.g., motion vectors) may include one or more motion estimates for one or more particular pixels and/or image portions (e.g., blocks) of the one or more frames. Motion estimates for a frame may collectively describe at least a portion of a transformation from one image to another reference image. In at least one embodiment, a motion estimate may include a motion vector. A motion vector may include, for example, a vector (e.g., a 2D vector) that provides an offset from coordinates in one frame(s) to coordinates in another frame(s). In one or more embodiments, a motion vector may include an X offset to an X component of a pixel and a Y offset to a Y component of the pixel. In at least one embodiment, the motion estimator 104 may determine one or more motion estimates for each pixel and/or block in a frame.

The motion estimator 104 may determine motion estimates using any suitable approach, such as using one or more of block-matching algorithms, phase correlation algorithms, pixel recursive algorithms, and/or optical flow algorithms. In various embodiment, the motion estimator 104 may compute motion estimates for forward and/or backward motion. Motion estimates for forward motion may use the frame(s) 102A as an input image(s) and the frame(s) 102B as a reference image(s). Motion estimates for backward motion may use the frame(s) 102B as an input image(s) and the frame(s) 102A as a reference image(s).

The motion estimator 104 may perform dense motion estimation and/or sparse motion estimation. Dense motion estimation may compute motion estimates for individual pixels. Sparse motion estimation may compute motion estimates for groups of pixels, such as blocks (e.g., 2×2, 4×4, 6×6, 8×8, etc.). Disclosed approaches may use any combination of dense and/or sparse motion estimates. In at least one embodiment, the motion estimator 104 may determine sparse motion estimates. The motion estimator 104 may then up-convert or up-scale one or more portions of the sparse motion estimates to dense and/or less sparse motion estimates, which may be used in disclosed embodiments. In at least one embodiment, up-scaling may be based at least on factors such as image intensity and edge locations.

In at least one embodiment, the motion estimator 104 may analyze one or more motion estimates and discard at least one motion estimate based at least on the analysis. For example, the motion estimator 104 may use the analysis to determine a motion estimate is incorrect and discard the motion estimate. By way of example, and not limitation, the analysis may involve forward projecting a first image location to a first reference image location using a forward motion estimate, and backward projecting a second image location to a second reference image location using a backward motion estimate. If the second reference image location resulting from the backward projection is not within a threshold distance from the first image location (e.g., not mapped to the same pixel location or within a threshold pixel distance thereof), the motion estimate(s) may be discarded. In at least one embodiment, the motion estimator 104 may perform upscaling after discarding any inconsistent motion estimates.

In at least one embodiment, the pixel data determiner 110 uses the motion estimates for the image portions to determine the location(s) for the image portions in an extrapolated frame. For example, the pixel data determiner 110 may use a motion estimate 240 to map the image portion 230 to the location 232 and may use a motion estimate 242 to map the image portion 234 to the location 232. In at least one embodiment, the mapping may include warping source pixels from the frames 102A and/or 102B to generate the frame 112. However, any suitable approach for mapping image portions to locations may be used. The collision 200 of FIG. 2 may result when the pixel data determiner 110 is attempting to generate the frame 112 to be temporally half-way between the frames 102A and 102B, but that need not be the case. For example, more than one frame 112 may be generated with any suitable temporal relationship to the frames 102A and 102B. In the example shown, the image portions 230 and 234 may be mapped to the location 232 based at least on virtually moving or projecting the image portions 230 and 234 along corresponding motion vectors with respect to the frame 112 and determining where the images portions 230 and 234 intersect with the frame 112, which is located half-way between the frames 102A and 102B. This process may be performed for any number of image portions of the frame 102A and/or the frame 102B, which may result in multiple collisions similar to the collision 200. The pixel data determiner 110 may be configured to resolve one or more of these collisions based on corresponding evaluations of levels of similarity performed using the similarity evaluator 108.

As described herein, the global motion determiner 106 may be configured to determine one or more global motion estimates (e.g., global motion vectors) corresponding to the one or more motion estimates (e.g., local motion estimates or vectors) determined using the motion estimator 104. A global motion estimate for a frame(s), such as the frame 102A, may be representative of motion for the overall frame(s). In at least one embodiment, the global motion estimate may be computed using one or more of the motion estimates determined for the frame(s) using the motion estimator 104. For example, the global motion determiner 106 may compute a global motion estimate (e.g., a global motion vector) for the frame 102A based at least on a statistical combination of the motion estimates (e.g., the dense motion estimates) for the frame 102A. Examples of statistical combinations include an average, a mode, a median, and/or one or more other statistically derived values. In at least one embodiment, the global motion determiner 106 may compute a global motion estimate per-frame. Additionally, or alternatively, the global motion determiner 106 may compute a global motion estimate that corresponds to multiple frames. For example, the global motion determiner 106 may compute a multi-frame global motion estimate corresponding to a moving average or other statistical combination of global motion estimate over a plurality of frames (e.g., a window of frames).

By way of example and not limitation, in at least one embodiment, the global motion determiner 106 may perform one or more image processing techniques or otherwise determine whether and/or to what extent a global motion estimate corresponds to background or foreground. The pixel data determiner 110 may use this determination when interpreting the evaluations of levels of similarity. For example, as described herein, where a global motion estimate corresponds to background, a high similarity for an image portion may indicate the image portion is at or near the background. Where a global motion estimate corresponds to foreground, a high similarity for an image portion may indicate the image portion is distant from the background—and thus in or closer to the foreground. Thus, the pixel data determiner 110 may adapt the interpretation of levels of similarity to the image content accordingly. In other examples, the pixel data determiner 110 may not adapt the interpretation of levels of similarity to the image content and may, for example, operate under the assumption that a global motion estimate corresponds to background or, in the alternative, that a global motion estimate corresponds to foreground.

In at least one embodiment, the global motion determiner 106 may determine whether and/or to what extent (e.g., percentage) an image corresponds to background or foreground based at least on a quantity of pixels of the image that are aligned with a global motion estimate (e.g., a multi-frame global estimate). For example, the global motion determiner 106 may determine a quantity of pixels of the image that are aligned with the global motion estimate. Where the quantity of pixels is below a threshold value, the global motion determiner 106 may determine the image primarily corresponds to foreground. Where the quantity of pixels is above a threshold value, the global motion determiner 106 may determine the image primarily corresponds to background. The pixel data determiner 110 may adapt the interpretation of levels of similarity to the image content accordingly.

Figure 4:
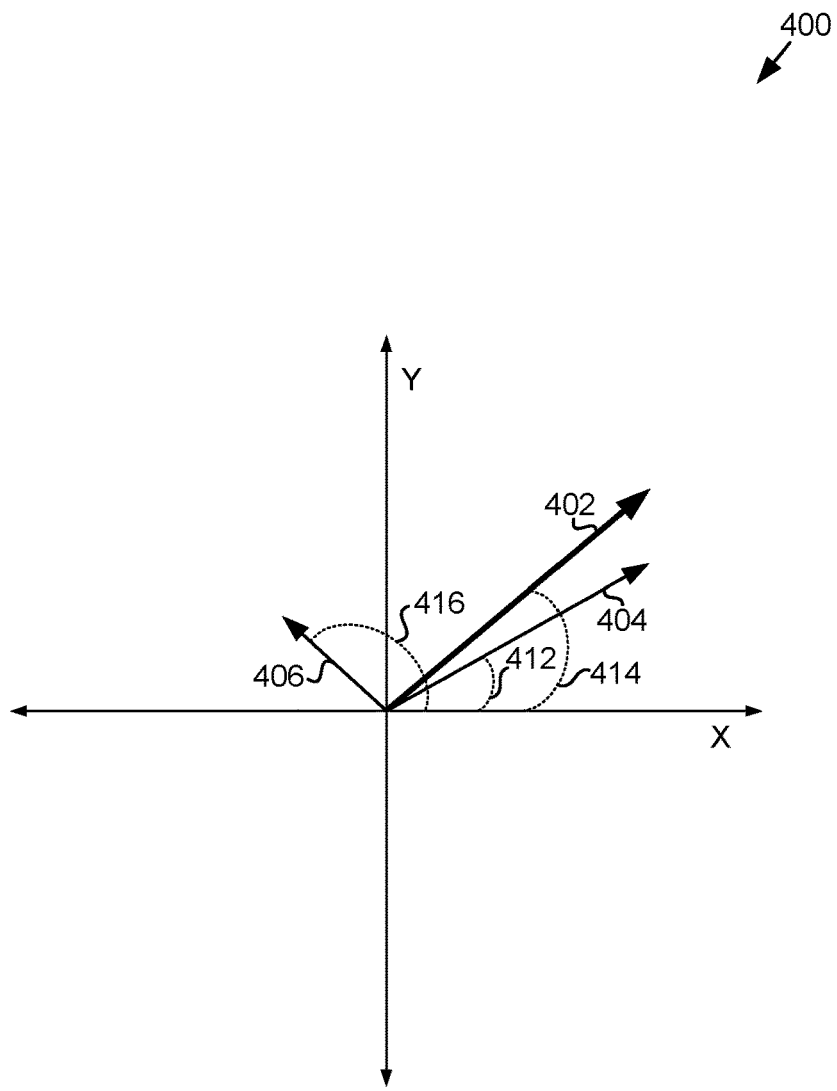
FIG. 4 illustrates a graph showing examples of a global motion vector and motion vectors which may be compared to the global motion vector, in accordance with some embodiments of the present disclosure.

Referring now to FIG. 4, FIG. 4 illustrates a graph 400 showing examples of a global motion vector 402 and motion vectors 406 and 408 (e.g., local motion vectors) which may be compared to the global motion vector 402, in accordance with some embodiments of the present disclosure. FIG. 4 may be used to describe various factors the similarity evaluator 108 may consider when evaluating levels of similarity between one or more motion estimates for pixels and/or image portions (e.g., for the frame 102A and/or the frame 102B) determined using the motion estimator 104 and one or more global motion estimates determined using the global motion determiner 106.

The similarity evaluator 108 may evaluate a level of similarity based on a variety of potential factors. In at least one embodiment, a level of similarity for one or more image portions may be based at least on a difference between one or more angles of one or more global motion vectors and one or more angles of one or more motion vectors for the one or more image portions. For example, the similarity evaluator 108 may evaluate a level of similarity between the global motion vector 402 and the motion vector 404 for an image portion based at least on a difference between an angle 414 of the motion vector 404 and an angle 412 of the global motion vector 402. Similarly, the similarity evaluator 108 may evaluate a level of similarity between the global motion vector 402 and the motion vector 406 for an image portion based at least on a difference between an angle 416 of the motion vector 406 and the angle 412 of the global motion vector 402. A level of similarity may increase as the difference decreases.

Additionally, or alternatively, a level of similarity for one or more image portions may be based at least on a difference between one or more magnitudes of one or more global motion vectors and one or more magnitudes of one or more motion vectors for the one or more image portions. For example, the similarity evaluator 108 may evaluate a level of similarity between the global motion vector 402 and the motion vector 404 for an image portion based at least on a difference between the magnitude of the motion vector 404 and the magnitude of the global motion vector 402. Similarly, the similarity evaluator 108 may evaluate a level of similarity between the global motion vector 402 and the motion vector 406 for an image portion based at least on a difference between the magnitude of the motion vector 406 and the magnitude of the global motion vector 402. A level of similarity may increase as the difference decreases.

In at least one embodiment, the similarity evaluator 108 may weigh the difference between the one or more angles in proportion to the one or more magnitudes of the one or more global motion vectors. For example, the angle difference for the motion vector 404 may be given more weight than the angle difference for the motion vector 406, as the motion vector 404 has a greater magnitude.

In at least one embodiment, the similarity evaluator 108 may compute one or more values (e.g., a similarity score) representing or corresponding to one or more levels of similarity for one or more image portions using one or more similarity metrics. A similarity metric may include one or more parameters representing one or more aspects or features of an image portion(s) and/or motion estimate(s). Examples of the aspects include motion estimate magnitude, motion vector angle, etc.

An example of an algorithm for computing at least a portion of a similarity metric is provided. However, many variations to the algorithm and similarity metric are possible. Global_Fx may refer to an X component of a global motion vector (e.g., the global motion vector 402 for the frame 102A) and Global_Fy may refer to a Y component of the global motion vector. Fx may refer to an X component of a motion vector for an image portion (e.g., the motion vector 404 for a pixel in the frame 102A) and Fy may refer to a Y component of the motion vector.

The similarity evaluator 108 may compute a magnitude rGlobal of the global motion vector using, for example, Equation (1):

$$rGlobal = \sqrt{Global\_Fx * Global\_Fx + Global\_Fy * Global\_Fy}. \quad (1)$$

The similarity evaluator 108 may compute an angle thetaGlobal of the global motion vector using, for example, Equation (2):

$$thetaGlobal = atan2(Global\_Fy, Global\_Fx). \quad (2)$$

The similarity evaluator 108 may also compute a magnitude rPixel of the motion vector using, for example, Equation (3):

$$rPixel = \sqrt{Fx*Fx + Fy*Fy}. \quad (3)$$

Further, the similarity evaluator 108 may compute an angle thetaPixel of the motion vector using, for example, Equation (4):

$$thetaPixel = atan2(Fy, Fx). \quad (4)$$

If thetaGlobal is less than zero, the similarity evaluator 108 may convert the angle to a positive angle using, for example, Equation (5):

$$thetaGlobal = 2*\pi + thetaGlobal. \quad (5)$$

Similarly, if thetaPixel is less than zero, the similarity evaluator 108 may convert the angle to a positive angle using, for example, Equation (6):

$$thetaPixel = 2*\pi + thetaPixel. \quad (6)$$

The similarity evaluator 108 may then compute a difference thetaDiff between thetaGlobal and thetaPixel using, for example, Equation (7):

$$thetaDiff = |thetaPixel - thetaGlobal|. \quad (7)$$

If thetaDiff is greater than n, the similarity evaluator 108 may adjust thetaDiff using, for example, Equation (8):

$$\text{thetaDiff} = 2*\pi - \text{thetaDiff}. \tag{8}$$

The similarity evaluator 108 may compute an angle-based similarity metric WarpCostAngle using, for example, Equation (9):

$$\text{CostAngle} = \alpha * \text{rGlobal} * (\beta * \text{thetaDiff} + \text{thetaDiff} * \text{thetaDiff}) \tag{9}$$

where α and β are constants, which may be derived heuristically. Using Equation (9), the contribution of thetaDiff may be proportional to rGlobal.

The similarity evaluator 108 may compute a Euclidian difference-based similarity metric EuclidDist using, for example, Equation (10):

$$\text{EuclidDist} = \sqrt{\text{delta\_fx} * \text{delta\_fx} + \text{delta\_fy} * \text{delta\_fy}}, \tag{10}$$

where delta_fx=Fx−Global_Fx and delta_fy=Fy−Global_Fy.

The similarity evaluator 108 may then compute a similarity metric WarpCost using, for example, Equation (11):

$$\text{WarpCost} = \text{EuclidDist} + \text{WarpCostAngle}. \tag{11}$$

The pixel data determiner 110 may use any combination of these similarity metrics to determine pixel data for locations in a frame, such as the frame 112. In at least one embodiment, when there is a collision between multiple source pixels, the pixel data determiner 110 may select the source pixel with the highest WarpCost as the pixel that provides the pixel data for the interpolated and/or extrapolated frame.

The pixel data determiner 110 may determine forward motion values of a similarity metric for image portions in the frame 102A (e.g., using forward motion estimates and a forward global motion estimate) for locations in the frame 112. Additionally, or alternatively, the pixel data determiner 110 may determine backward motion values of the similarity metric for image portions in the frame 102B (e.g., using backward motion estimates and a backward global motion estimate) for locations in the frame 112. In at least one embodiment, the pixel data determiner 110 may select from the image portions to use for the locations in the frame 112 (and/or weigh the image portions) based at least on the corresponding forward motion values and backward motion values. For example, a forward motion value and a backward motion value may be combined (e.g., averaged) to compute a composite value used to select an image portion and/or determine an image portion weighting. As a further example, forward motion values may be used as a default, and where forward motion values are unavailable, backward motion values may be used. In one or more embodiments, the similarity evaluator 108 may use only forward motion values, or only backward motion values. In at least one embodiment, forward motion estimates and a forward global motion estimate may be combined with backward motion estimates and a backward global motion estimate, and the similarity evaluator 108 may use the aggregated motion estimates to compute values of the similarity metric(s).

Figure 5:
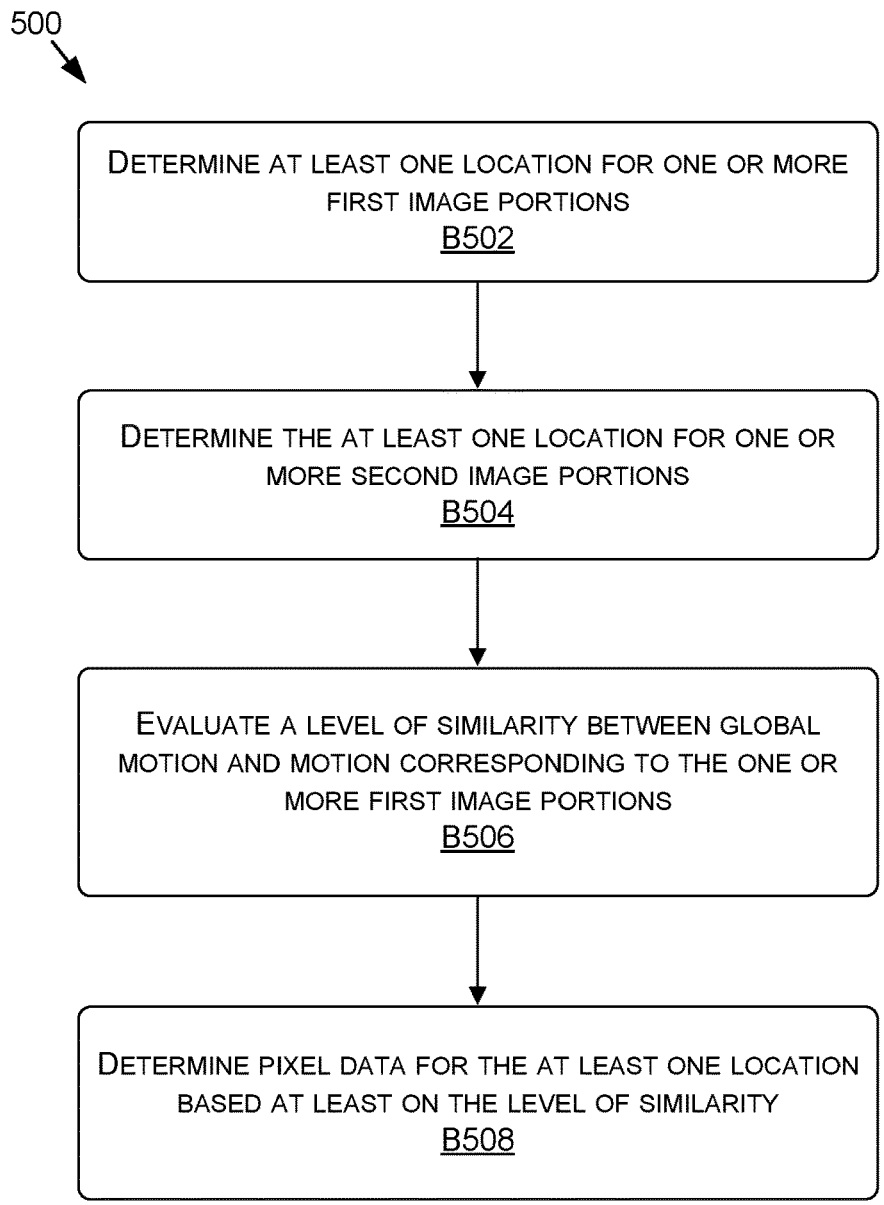
FIG. 5 is a flow diagram showing a method for determining pixel data for a location in an image based at least on determining the location for multiple image portions, in accordance with some embodiments of the present disclosure.
Figure 6:
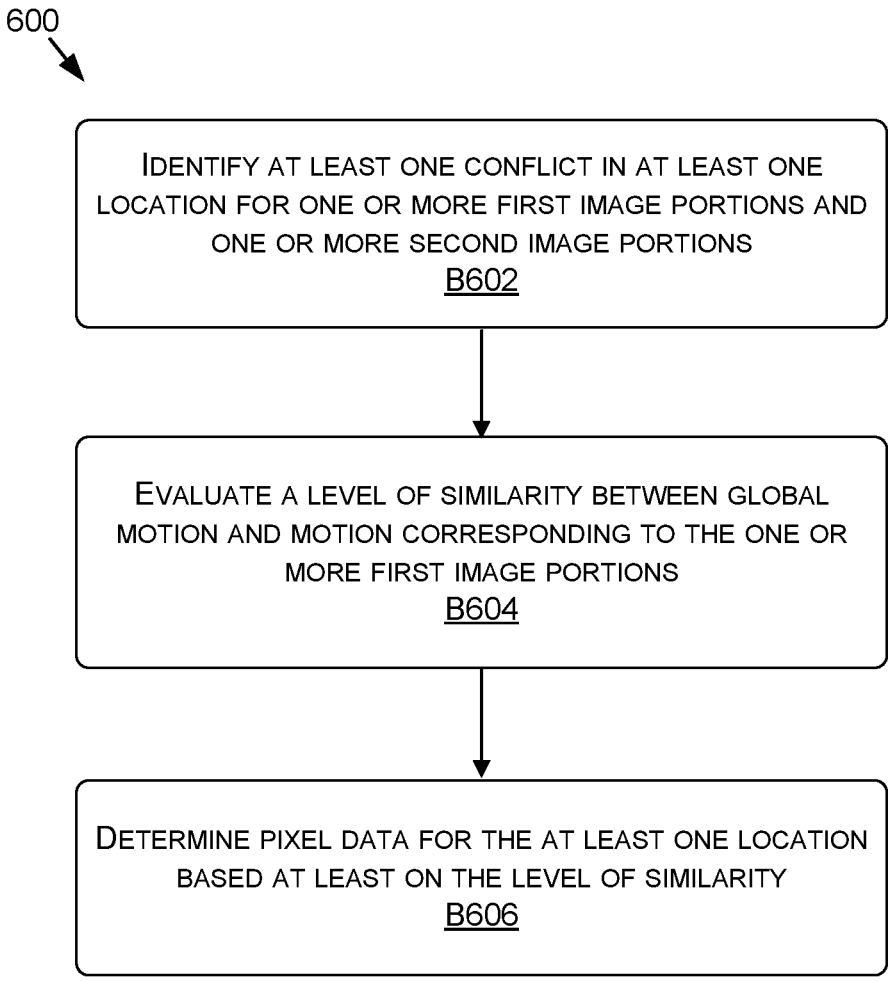
FIG. 6 is a flow diagram showing a method for determining pixel data for a location in an image based at least on identifying a conflict in the location between multiple image portions, in accordance with some embodiments of the present disclosure.
Figure 7:
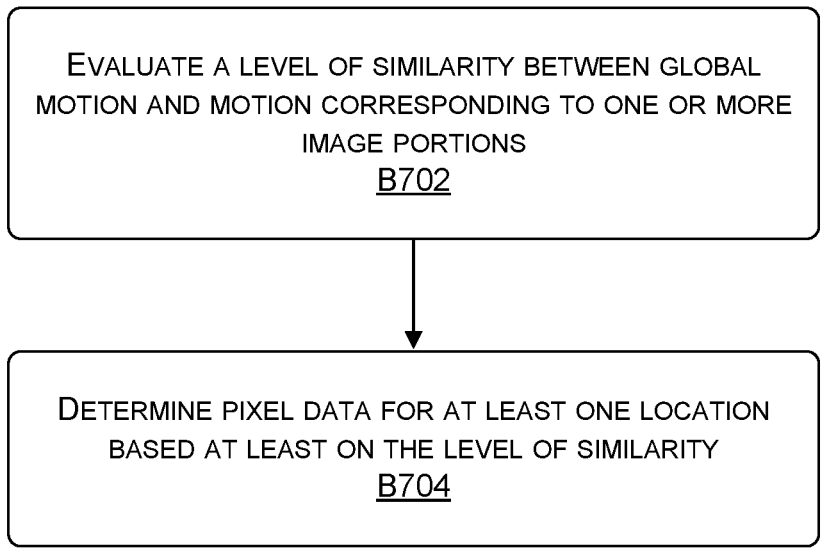
FIG. 7 is a flow diagram showing a method for determining pixel data for a location in an image based at least on a level of similarity between global motion and motion corresponding to one or more image portions, in accordance with some embodiments of the present disclosure.

Now referring to FIGS. 5-7, each block of method 500, 600, and 700, and other methods described herein, may comprise a computing process that may be performed using any combination of hardware, firmware, and/or software. For instance, various functions may be carried out by a processor executing instructions stored in memory. The methods may also be embodied as computer-usable instructions stored on computer storage media. The methods may be provided by a standalone application, a service or hosted service (standalone or in combination with another hosted service), or a plug-in to another product, to name a few. In addition, methods are described, by way of example, with respect to particular figures. However, the methods may additionally or alternatively be executed by any one system, or any combination of systems, including, but not limited to, those described herein.

Figure 8:
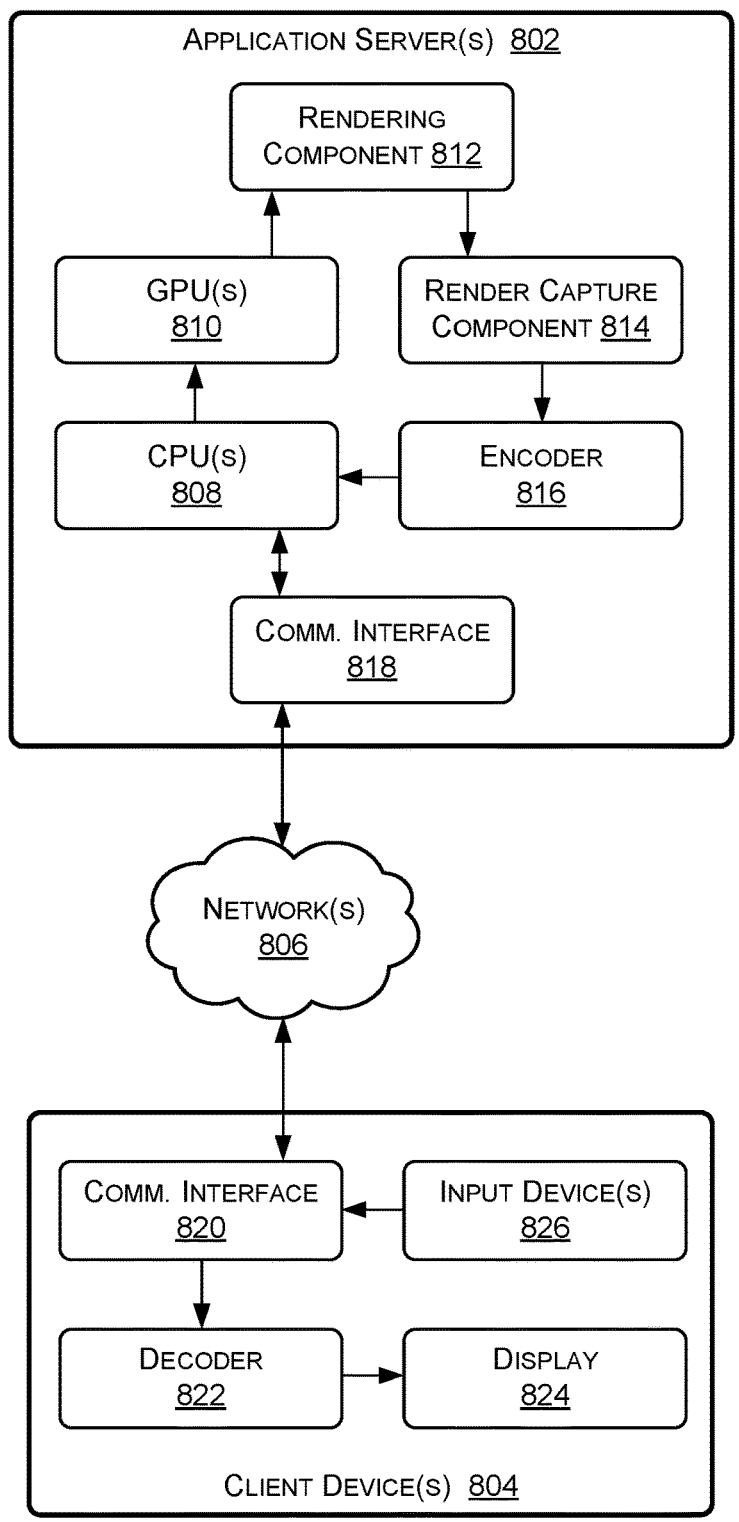
FIG. 8 is a block diagram of an example content streaming system suitable for use in implementing some embodiments of the present disclosure.

In at least one embodiment, the system 100 may include one or more components of a content streaming system 800 of FIG. 8. For example, the system 100 may be included in the application server(s) 802. Additionally, or alternatively, one or more components of the content streaming system 800 of FIG. 8 may perform one or more portions of any of the various methods described herein.

FIG. 5 is a flow diagram showing a method 500 for determining pixel data for a location in an image based at least on determining the location for multiple image portions, in accordance with some embodiments of the present disclosure. The method 500, at block B502, includes determining at least one location for one or more first image portions. For example, the pixel data determiner 110 may determine the location 232 for the image portion 230.

At block B504, the method 500 includes determining the at least one location for one or more second image portions. For example, the pixel data determiner 110 may determine the location 232 for the image portion 234.

At block B506, the method 500 includes evaluating a level of similarity between global motion and motion corresponding to the one or more first image portions. For example, the similarity evaluator 108 may evaluate a level of similarity between the global motion vector 402 corresponding to the frame 102A and the motion vector 404 corresponding to the image portion 230 (e.g., where the motion vector 404 corresponds to the motion vector 240 in FIG. 2). In at least one embodiment, the method 500 may further include evaluating a level of similarity between global motion and motion corresponding to the one or more second image portions. For example, the similarity evaluator 108 may evaluate a level of similarity between the global motion vector 402 corresponding to the frame 102A and the motion vector 406 corresponding to the image portion 234 (e.g., where the motion vector 406 corresponds to the motion vector 242 in FIG. 2).

At block B508, the method 500 includes determining pixel data for the at least one location based at least on the level of similarity. For example, the pixel data determiner 110 may generate pixel data for the location 232 using the image portion 230 based at least on the level of similarity corresponding to the motion vector 404. In at least one embodiment, the pixel data determiner 110 may further generate the pixel data for the location 232 using the image portion 230 based at least on the level of similarity corresponding to the motion vector 406.

Referring now to FIG. 6, FIG. 6 is a flow diagram showing a method for determining pixel data for a location in an image based at least on identifying a conflict in the location between multiple image portions, in accordance with some embodiments of the present disclosure. The method 600, at block B602, includes identifying at least one conflict in at least one location for one or more first image portions and one or more second image portions. For example, the pixel data determiner 110 may identify at least one conflict in the location 232 between the image portion 230 of the frame 102A in the video 102 and the image portion 230 of the frame 102B in the video 102.

At block B604, the method 600 includes evaluating a level of similarity between global motion and motion corresponding to the one or more first image portions. For example, the similarity evaluator 108 may evaluate a level of similarity between the global motion vector 402 corresponding to the frame 102A and the motion vector 404 corresponding to the image portion 230. In at least one embodiment, the similarity evaluator 108 may also evaluate a level of similarity between the global motion vector 402 corresponding to the frame 102A and the motion vector 406 corresponding to the image portion 234.

At block B608, the method 600 includes determining pixel data for the at least one location based at least on the level of similarity. For example, the pixel data determiner 110 may generate pixel data for the location 232 using the image portion 230 based at least on the level of similarity for the motion vector 404. In at least one embodiment, the pixel data determiner 110 may further generate the pixel data for the location 232 using the image portion 230 based at least on the level of similarity for the motion vector 406.

Referring now to FIG. 7, FIG. 7 is a flow diagram showing a method 700 for determining pixel data for a location in an image based at least on a level of similarity between global motion and motion corresponding to one or more image portions, in accordance with some embodiments of the present disclosure. The method 700, at block B702, includes evaluating a level of similarity between global motion and motion corresponding to one or more image portions. For example, the similarity evaluator 108 may evaluate a level of similarity between the global motion vector 402 corresponding to the frame 102A and the motion vector 404 corresponding to the image portion 230.

At block B704, the method 700 includes determining pixel data for at least one location based at least on the level of similarity. For example, the pixel data determiner 110 may generate pixel data for the location 232 using the image portion 230 based at least on the level of similarity.

Example Content Streaming System

Now referring to FIG. 8, FIG. 8 is an example system diagram for a content streaming system 800, in accordance with some embodiments of the present disclosure. FIG. 8 includes application server(s) 802 (which may include similar components, features, and/or functionality to the example computing device 900 of FIG. 9), client device(s) 804 (which may include similar components, features, and/or functionality to the example computing device 900 of FIG. 9), and network(s) 806 (which may be similar to the network(s) described herein). In some embodiments of the present disclosure, the system 800 may be implemented. The application session may correspond to a game streaming application (e.g., NVIDIA GeForce NOW), a remote desktop application, a simulation application (e.g., autonomous or semi-autonomous vehicle simulation), computer aided design (CAD) applications, virtual reality (VR), augmented reality (AR), and/or mixed reality (MR) streaming applications, deep learning applications, and/or other application types.

In the system 800, for an application session, the client device(s) 804 may only receive input data in response to inputs to the input device(s), transmit the input data to the application server(s) 802, receive encoded display data from the application server(s) 802, and display the display data on the display 824. As such, the more computationally intense computing and processing is offloaded to the application server(s) 802 (e.g., rendering—in particular ray or path tracing—for graphical output of the application session is executed by the GPU(s) of the game server(s) 802). In other words, the application session is streamed to the client device(s) 804 from the application server(s) 802, thereby reducing the requirements of the client device(s) 804 for graphics processing and rendering.

For example, with respect to an instantiation of an application session, a client device 804 may be displaying a frame of the application session on the display 824 based on receiving the display data from the application server(s) 802. The client device 804 may receive an input to one of the input device(s) and generate input data in response. The client device 804 may transmit the input data to the application server(s) 802 via the communication interface 820 and over the network(s) 806 (e.g., the Internet), and the application server(s) 802 may receive the input data via the communication interface 818. The CPU(s) may receive the input data, process the input data, and transmit data to the GPU(s) that causes the GPU(s) to generate a rendering of the application session. For example, the input data may be representative of a movement of a character of the user in a game session of a game application, firing a weapon, reloading, passing a ball, turning a vehicle, etc. The rendering component 812 may render the application session (e.g., representative of the result of the input data) and the render capture component 814 may capture the rendering of the application session as display data (e.g., as image data capturing the rendered frame of the application session). The rendering of the application session may include ray or path-traced lighting and/or shadow effects, computed using one or more parallel processing units—such as GPUs, which may further employ the use of one or more dedicated hardware accelerators or processing cores to perform ray or path-tracing techniques—of the application server(s) 802. In some embodiments, one or more virtual machines (VMs)—e.g., including one or more virtual components, such as vGPUs, vCPUs, etc.—may be used by the application server(s) 802 to support the application sessions. The encoder 816 may then encode the display data to generate encoded display data and the encoded display data may be transmitted to the client device 804 over the network(s) 806 via the communication interface 818. The client device 804 may receive the encoded display data via the communication interface 820 and the decoder 822 may decode the encoded display data to generate the display data. The client device 804 may then display the display data via the display 824.

The systems and methods described herein may be used for a variety of purposes, by way of example and without limitation, for machine control, machine locomotion, machine driving, synthetic data generation, model training, perception, augmented reality, virtual reality, mixed reality, robotics, security and surveillance, simulation and digital twinning, autonomous or semi-autonomous machine applications, deep learning, environment simulation, data center processing, conversational AI, light transport simulation (e.g., ray-tracing, path tracing, etc.), collaborative content creation for 3D assets, cloud computing and/or any other suitable applications.

Disclosed embodiments may be comprised in a variety of different systems such as automotive systems (e.g., a control system for an autonomous or semi-autonomous machine, a perception system for an autonomous or semi-autonomous machine), systems implemented using a robot, aerial systems, medial systems, boating systems, smart area monitoring systems, systems for performing deep learning operations, systems for performing simulation operations, systems for performing digital twin operations, systems implemented using an edge device, systems incorporating one or more virtual machines (VMs), systems for performing synthetic data generation operations, systems implemented at least partially in a data center, systems for performing conversational AI operations, systems for performing light transport simulation, systems for performing collaborative content creation for 3D assets, systems implemented at least partially using cloud computing resources, and/or other types of systems.

Example Computing Device

Figure 9:
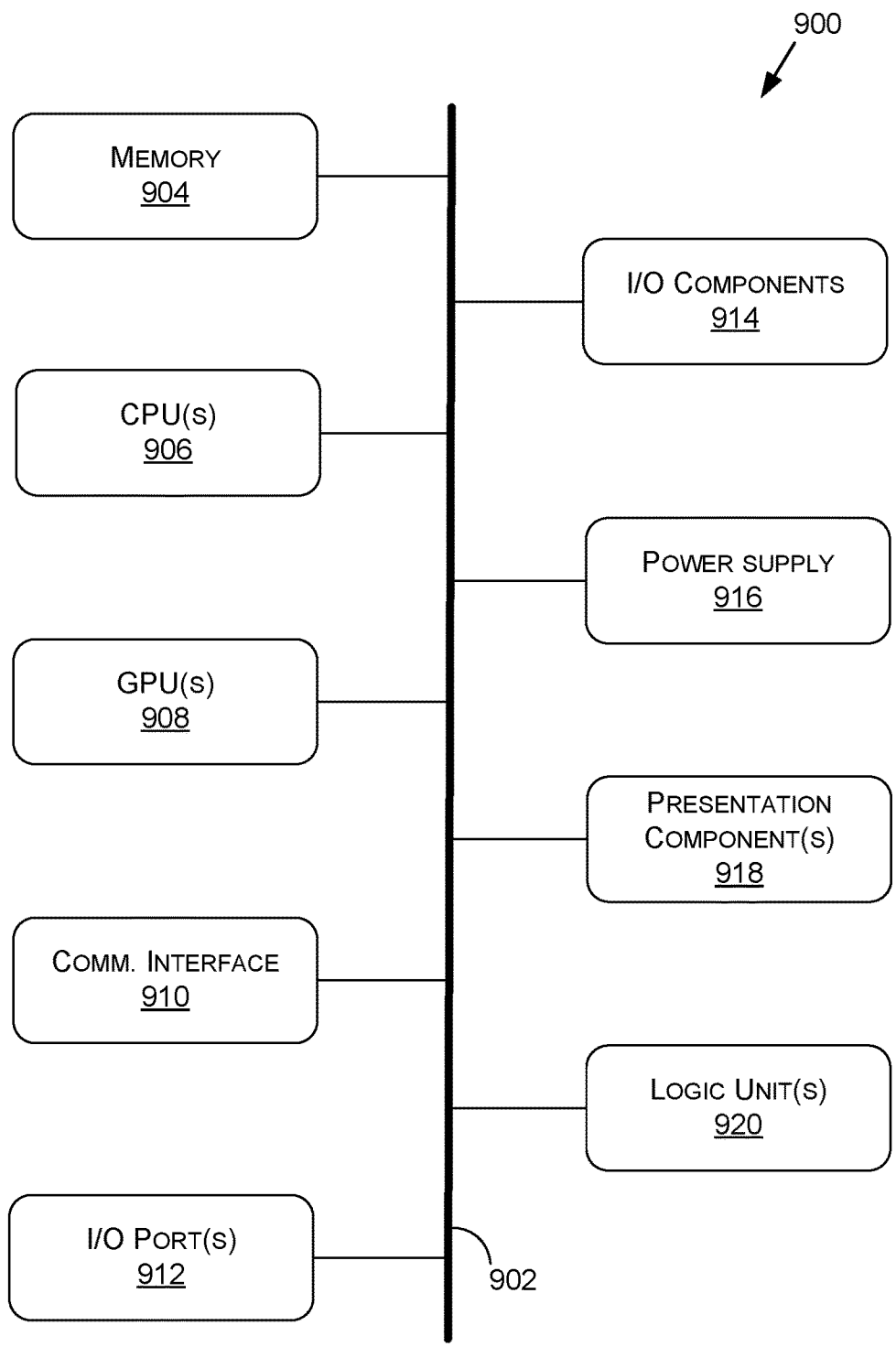
FIG. 9 is a block diagram of an example computing device suitable for use in implementing some embodiments of the present disclosure.

FIG. 9 is a block diagram of an example computing device(s) 900 suitable for use in implementing some embodiments of the present disclosure. Computing device 900 may include an interconnect system 902 that directly or indirectly couples the following devices: memory 904, one or more central processing units (CPUs) 906, one or more graphics processing units (GPUs) 908, a communication interface 910, input/output (I/O) ports 912, input/output components 914, a power supply 916, one or more presentation components 918 (e.g., display(s)), and one or more logic units 920. In at least one embodiment, the computing device(s) 900 may comprise one or more virtual machines (VMs), and/or any of the components thereof may comprise virtual components (e.g., virtual hardware components). For non-limiting examples, one or more of the GPUs 908 may comprise one or more vGPUs, one or more of the CPUs 906 may comprise one or more vCPUs, and/or one or more of the logic units 920 may comprise one or more virtual logic units. As such, a computing device(s) 900 may include discrete components (e.g., a full GPU dedicated to the computing device 900), virtual components (e.g., a portion of a GPU dedicated to the computing device 900), or a combination thereof.

Although the various blocks of FIG. 9 are shown as connected via the interconnect system 902 with lines, this is not intended to be limiting and is for clarity only. For example, in some embodiments, a presentation component 918, such as a display device, may be considered an I/O component 914 (e.g., if the display is a touch screen). As another example, the CPUs 906 and/or GPUs 908 may include memory (e.g., the memory 904 may be representative of a storage device in addition to the memory of the GPUs 908, the CPUs 906, and/or other components). In other words, the computing device of FIG. 9 is merely illustrative. Distinction is not made between such categories as "workstation," "server," "laptop," "desktop," "tablet," "client device," "mobile device," "hand-held device," "game console," "electronic control unit (ECU)," "virtual reality system," and/or other device or system types, as all are contemplated within the scope of the computing device of FIG. 9.

The interconnect system 902 may represent one or more links or busses, such as an address bus, a data bus, a control bus, or a combination thereof. The interconnect system 902 may include one or more bus or link types, such as an industry standard architecture (ISA) bus, an extended industry standard architecture (EISA) bus, a video electronics standards association (VESA) bus, a peripheral component interconnect (PCI) bus, a peripheral component interconnect express (PCIe) bus, and/or another type of bus or link. In some embodiments, there are direct connections between components. As an example, the CPU 906 may be directly connected to the memory 904. Further, the CPU 906 may be directly connected to the GPU 908. Where there is direct, or point-to-point connection between components, the interconnect system 902 may include a PCIe link to carry out the connection. In these examples, a PCI bus need not be included in the computing device 900.

The memory 904 may include any of a variety of computer-readable media. The computer-readable media may be any available media that may be accessed by the computing device 900. The computer-readable media may include both volatile and nonvolatile media, and removable and non-removable media. By way of example, and not limitation, the computer-readable media may comprise computer-storage media and communication media.

The computer-storage media may include both volatile and nonvolatile media and/or removable and non-removable media implemented in any method or technology for storage of information such as computer-readable instructions, data structures, program modules, and/or other data types. For example, the memory 904 may store computer-readable instructions (e.g., that represent a program(s) and/or a program element(s), such as an operating system. Computer-storage media may include, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which may be used to store the desired information and which may be accessed by computing device 900. As used herein, computer storage media does not comprise signals per se.

The computer storage media may embody computer-readable instructions, data structures, program modules, and/or other data types in a modulated data signal such as a carrier wave or other transport mechanism and includes any information delivery media. The term "modulated data signal" may refer to a signal that has one or more of its characteristics set or changed in such a manner as to encode information in the signal. By way of example, and not limitation, the computer storage media may include wired media such as a wired network or direct-wired connection, and wireless media such as acoustic, RF, infrared and other wireless media. Combinations of any of the above should also be included within the scope of computer-readable media.

The CPU(s) 906 may be configured to execute at least some of the computer-readable instructions to control one or more components of the computing device 900 to perform one or more of the methods and/or processes described herein. The CPU(s) 906 may each include one or more cores (e.g., one, two, four, eight, twenty-eight, seventy-two, etc.) that are capable of handling a multitude of software threads simultaneously. The CPU(s) 906 may include any type of processor, and may include different types of processors depending on the type of computing device 900 implemented (e.g., processors with fewer cores for mobile devices and processors with more cores for servers). For example, depending on the type of computing device 900, the processor may be an Advanced RISC Machines (ARM) processor implemented using Reduced Instruction Set Computing (RISC) or an x86 processor implemented using Complex Instruction Set Computing (CISC). The computing device 900 may include one or more CPUs 906 in addition to one or more microprocessors or supplementary co-processors, such as math co-processors.

In addition to or alternatively from the CPU(s) 906, the GPU(s) 908 may be configured to execute at least some of the computer-readable instructions to control one or more components of the computing device 900 to perform one or more of the methods and/or processes described herein. One or more of the GPU(s) 908 may be an integrated GPU (e.g., with one or more of the CPU(s) 906 and/or one or more of the GPU(s) 908 may be a discrete GPU. In embodiments, one or more of the GPU(s) 908 may be a coprocessor of one or more of the CPU(s) 906. The GPU(s) 908 may be used by the computing device 900 to render graphics (e.g., 3D graphics) or perform general purpose computations. For example, the GPU(s) 908 may be used for General-Purpose computing on GPUs (GPGPU). The GPU(s) 908 may include hundreds or thousands of cores that are capable of handling hundreds or thousands of software threads simultaneously. The GPU(s) 908 may generate pixel data for output images in response to rendering commands (e.g., rendering commands from the CPU(s) 906 received via a host interface). The GPU(s) 908 may include graphics memory, such as display memory, for storing pixel data or any other suitable data, such as GPGPU data. The display memory may be included as part of the memory 904. The GPU(s) 908 may include two or more GPUs operating in parallel (e.g., via a link). The link may directly connect the GPUs (e.g., using NVLINK) or may connect the GPUs through a switch (e.g., using NVSwitch). When combined together, each GPU 908 may generate pixel data or GPGPU data for different portions of an output or for different outputs (e.g., a first GPU for a first image and a second GPU for a second image). Each GPU may include its own memory, or may share memory with other GPUs.

In addition to or alternatively from the CPU(s) 906 and/or the GPU(s) 908, the logic unit(s) 920 may be configured to execute at least some of the computer-readable instructions to control one or more components of the computing device 900 to perform one or more of the methods and/or processes described herein. In embodiments, the CPU(s) 906, the GPU(s) 908, and/or the logic unit(s) 920 may discretely or jointly perform any combination of the methods, processes and/or portions thereof. One or more of the logic units 920 may be part of and/or integrated in one or more of the CPU(s) 906 and/or the GPU(s) 908 and/or one or more of the logic units 920 may be discrete components or otherwise external to the CPU(s) 906 and/or the GPU(s) 908. In embodiments, one or more of the logic units 920 may be a coprocessor of one or more of the CPU(s) 906 and/or one or more of the GPU(s) 908.

Examples of the logic unit(s) 920 include one or more processing cores and/or components thereof, such as Data Processing Units (DPUs), Tensor Cores (TCs), Tensor Processing Units(TPUs), Pixel Visual Cores (PVCs), Vision Processing Units (VPUs), Graphics Processing Clusters (GPCs), Texture Processing Clusters (TPCs), Streaming Multiprocessors (SMs), Tree Traversal Units (TTUs), Artificial Intelligence Accelerators (AIAs), Deep Learning Accelerators (DLAs), Arithmetic-Logic Units (ALUs), Application-Specific Integrated Circuits (ASICs), Floating Point Units (FPUs), input/output (I/O) elements, peripheral component interconnect (PCI) or peripheral component interconnect express (PCIe) elements, and/or the like.

The communication interface 910 may include one or more receivers, transmitters, and/or transceivers that enable the computing device 900 to communicate with other computing devices via an electronic communication network, included wired and/or wireless communications. The communication interface 910 may include components and functionality to enable communication over any of a number of different networks, such as wireless networks (e.g., Wi-Fi, Z-Wave, Bluetooth, Bluetooth LE, ZigBee, etc.), wired networks (e.g., communicating over Ethernet or InfiniBand), low-power wide-area networks (e.g., LoRaWAN, SigFox, etc.), and/or the Internet. In one or more embodiments, logic unit(s) 920 and/or communication interface 910 may include one or more data processing units (DPUs) to transmit data received over a network and/or through interconnect system 902 directly to (e.g., a memory of) one or more GPU(s) 908.

The I/O ports 912 may enable the computing device 900 to be logically coupled to other devices including the I/O components 914, the presentation component(s) 918, and/or other components, some of which may be built in to (e.g., integrated in) the computing device 900. Illustrative I/O components 914 include a microphone, mouse, keyboard, joystick, game pad, game controller, satellite dish, scanner, printer, wireless device, etc. The I/O components 914 may provide a natural user interface (NUI) that processes air gestures, voice, or other physiological inputs generated by a user. In some instances, inputs may be transmitted to an appropriate network element for further processing. An NUI may implement any combination of speech recognition, stylus recognition, facial recognition, biometric recognition, gesture recognition both on screen and adjacent to the screen, air gestures, head and eye tracking, and touch recognition (as described in more detail below) associated with a display of the computing device 900. The computing device 900 may be include depth cameras, such as stereoscopic camera systems, infrared camera systems, RGB camera systems, touchscreen technology, and combinations of these, for gesture detection and recognition. Additionally, the computing device 900 may include accelerometers or gyroscopes (e.g., as part of an inertia measurement unit (IMU)) that enable detection of motion. In some examples, the output of the accelerometers or gyroscopes may be used by the computing device 900 to render immersive augmented reality or virtual reality.

The power supply 916 may include a hard-wired power supply, a battery power supply, or a combination thereof. The power supply 916 may provide power to the computing device 900 to enable the components of the computing device 900 to operate.

The presentation component(s) 918 may include a display (e.g., a monitor, a touch screen, a television screen, a heads-up-display (HUD), other display types, or a combination thereof), speakers, and/or other presentation components. The presentation component(s) 918 may receive data from other components (e.g., the GPU(s) 908, the CPU(s) 906, DPUs, etc.), and output the data (e.g., as an image, video, sound, etc.).

Example Data Center

Figure 10:
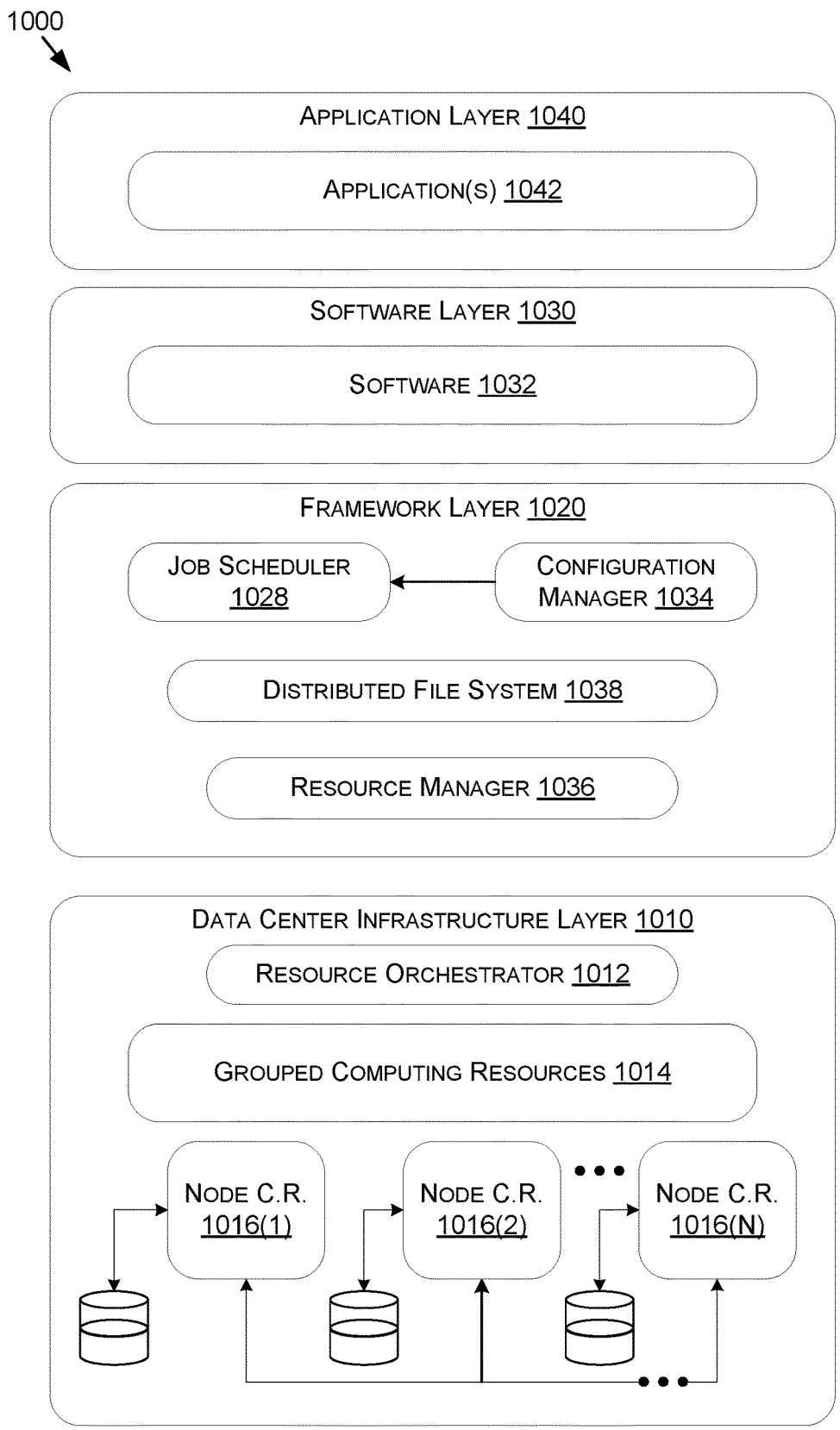
FIG. 10 is a block diagram of an example data center suitable for use in implementing some embodiments of the present disclosure.

FIG. 10 illustrates an example data center 1000 that may be used in at least one embodiments of the present disclosure. The data center 1000 may include a data center infrastructure layer 1010, a framework layer 1020, a software layer 1030, and/or an application layer 1040.

As shown in FIG. 10, the data center infrastructure layer 1010 may include a resource orchestrator 1012, grouped computing resources 1014, and node computing resources ("node C.R.s") 1016(1)-1016(N), where "N" represents any whole, positive integer. In at least one embodiment, node C.R.s 1016(1)-1016(N) may include, but are not limited to, any number of central processing units (CPUs) or other processors (including DPUs, accelerators, field programmable gate arrays (FPGAs), graphics processors or graphics processing units (GPUs), etc.), memory devices (e.g., dynamic read-only memory), storage devices (e.g., solid state or disk drives), network input/output (NW I/O) devices, network switches, virtual machines (VMs), power modules, and/or cooling modules, etc. In some embodiments, one or more node C.R.s from among node C.R.s 1016(1)-1016(N) may correspond to a server having one or more of the above-mentioned computing resources. In addition, in some embodiments, the node C.R.s 1016(1)-10161 (N) may include one or more virtual components, such as vGPUs, vCPUs, and/or the like, and/or one or more of the node C.R.s 1016(1)-1016(N) may correspond to a virtual machine (VM).

In at least one embodiment, grouped computing resources 1014 may include separate groupings of node C.R.s 1016 housed within one or more racks (not shown), or many racks housed in data centers at various geographical locations (also not shown). Separate groupings of node C.R.s 1016 within grouped computing resources 1014 may include grouped compute, network, memory or storage resources that may be configured or allocated to support one or more workloads. In at least one embodiment, several node C.R.s 1016 including CPUs, GPUs, DPUs, and/or other processors may be grouped within one or more racks to provide compute resources to support one or more workloads. The one or more racks may also include any number of power modules, cooling modules, and/or network switches, in any combination.

The resource orchestrator 1012 may configure or otherwise control one or more node C.R.s 1016(1)-1016(N) and/or grouped computing resources 1014. In at least one embodiment, resource orchestrator 1012 may include a software design infrastructure (SDI) management entity for the data center 1000. The resource orchestrator 1012 may include hardware, software, or some combination thereof.

In at least one embodiment, as shown in FIG. 10, framework layer 1020 may include a job scheduler 1028, a configuration manager 1034, a resource manager 1036, and/or a distributed file system 1038. The framework layer 1020 may include a framework to support software 1032 of software layer 1030 and/or one or more application(s) 1042 of application layer 1040. The software 1032 or application(s) 1042 may respectively include web-based service software or applications, such as those provided by Amazon Web Services, Google Cloud and Microsoft Azure. The framework layer 1020 may be, but is not limited to, a type of free and open-source software web application framework such as Apache Spark™ (hereinafter "Spark") that may utilize distributed file system 1038 for large-scale data processing (e.g., "big data"). In at least one embodiment, job scheduler 1028 may include a Spark driver to facilitate scheduling of workloads supported by various layers of data center 1000. The configuration manager 1034 may be capable of configuring different layers such as software layer 1030 and framework layer 1020 including Spark and distributed file system 1038 for supporting large-scale data processing. The resource manager 1036 may be capable of managing clustered or grouped computing resources mapped to or allocated for support of distributed file system 1038 and job scheduler 1028. In at least one embodiment, clustered or grouped computing resources may include grouped computing resource 1014 at data center infrastructure layer 1010. The resource manager 1036 may coordinate with resource orchestrator 1012 to manage these mapped or allocated computing resources.

In at least one embodiment, software 1032 included in software layer 1030 may include software used by at least portions of node C.R.s 1016(1)-1016(N), grouped computing resources 1014, and/or distributed file system 1038 of framework layer 1020. One or more types of software may include, but are not limited to, Internet web page search software, e-mail virus scan software, database software, and streaming video content software.

In at least one embodiment, application(s) 1042 included in application layer 1040 may include one or more types of applications used by at least portions of node C.R.s 1016(1)-1016(N), grouped computing resources 1014, and/or distributed file system 1038 of framework layer 1020. One or more types of applications may include, but are not limited to, any number of a genomics application, a cognitive compute, and a machine learning application, including training or inferencing software, machine learning framework software (e.g., PyTorch, TensorFlow, Caffe, etc.), and/or other machine learning applications used in conjunction with one or more embodiments.

In at least one embodiment, any of configuration manager 1034, resource manager 1036, and resource orchestrator 1012 may implement any number and type of self-modifying actions based on any amount and type of data acquired in any technically feasible fashion. Self-modifying actions may relieve a data center operator of data center 1000 from making possibly bad configuration decisions and possibly avoiding underutilized and/or poor performing portions of a data center.

The data center 1000 may include tools, services, software or other resources to train one or more machine learning models or predict or infer information using one or more machine learning models according to one or more embodiments described herein. For example, a machine learning model(s) may be trained by calculating weight parameters according to a neural network architecture using software and/or computing resources described above with respect to the data center 1000. In at least one embodiment, trained or deployed machine learning models corresponding to one or more neural networks may be used to infer or predict information using resources described above with respect to the data center 1000 by using weight parameters calculated through one or more training techniques, such as but not limited to those described herein.

In at least one embodiment, the data center 1000 may use CPUs, application-specific integrated circuits (ASICs), GPUs, FPGAs, and/or other hardware (or virtual compute resources corresponding thereto) to perform training and/or inferencing using above-described resources. Moreover, one or more software and/or hardware resources described above may be configured as a service to allow users to train or performing inferencing of information, such as image recognition, speech recognition, or other artificial intelligence services.

Example Network Environments

Network environments suitable for use in implementing embodiments of the disclosure may include one or more client devices, servers, network attached storage (NAS), other backend devices, and/or other device types. The client devices, servers, and/or other device types (e.g., each device) may be implemented on one or more instances of the computing device(s) 900 of FIG. 9—e.g., each device may include similar components, features, and/or functionality of the computing device(s) 900. In addition, where backend devices (e.g., servers, NAS, etc.) are implemented, the backend devices may be included as part of a data center 1000, an example of which is described in more detail herein with respect to FIG. 10.

Components of a network environment may communicate with each other via a network(s), which may be wired, wireless, or both. The network may include multiple networks, or a network of networks. By way of example, the network may include one or more Wide Area Networks (WANs), one or more Local Area Networks (LANs), one or more public networks such as the Internet and/or a public switched telephone network (PSTN), and/or one or more private networks. Where the network includes a wireless telecommunications network, components such as a base station, a communications tower, or even access points (as well as other components) may provide wireless connectivity.

Compatible network environments may include one or more peer-to-peer network environments—in which case a server may not be included in a network environment—and one or more client-server network environments—in which case one or more servers may be included in a network environment. In peer-to-peer network environments, functionality described herein with respect to a server(s) may be implemented on any number of client devices.

In at least one embodiment, a network environment may include one or more cloud-based network environments, a distributed computing environment, a combination thereof, etc. A cloud-based network environment may include a framework layer, a job scheduler, a resource manager, and a distributed file system implemented on one or more of servers, which may include one or more core network servers and/or edge servers. A framework layer may include a framework to support software of a software layer and/or one or more application(s) of an application layer. The software or application(s) may respectively include web-based service software or applications. In embodiments, one or more of the client devices may use the web-based service software or applications (e.g., by accessing the service software and/or applications via one or more application programming interfaces (APIs)). The framework layer may be, but is not limited to, a type of free and open-source software web application framework such as that may use a distributed file system for large-scale data processing (e.g., "big data").

A cloud-based network environment may provide cloud computing and/or cloud storage that carries out any combination of computing and/or data storage functions described herein (or one or more portions thereof). Any of these various functions may be distributed over multiple locations from central or core servers (e.g., of one or more data centers that may be distributed across a state, a region, a country, the globe, etc.). If a connection to a user (e.g., a client device) is relatively close to an edge server(s), a core server(s) may designate at least a portion of the functionality to the edge server(s). A cloud-based network environment may be private (e.g., limited to a single organization), may be public (e.g., available to many organizations), and/or a combination thereof (e.g., a hybrid cloud environment).

The client device(s) may include at least some of the components, features, and functionality of the example computing device(s) 900 described herein with respect to FIG. 9. By way of example and not limitation, a client device may be embodied as a Personal Computer (PC), a laptop computer, a mobile device, a smartphone, a tablet computer, a smart watch, a wearable computer, a Personal Digital Assistant (PDA), an MP3 player, a virtual reality headset, a Global Positioning System (GPS) or device, a video player, a video camera, a surveillance device or system, a vehicle, a boat, a flying vessel, a virtual machine, a drone, a robot, a handheld communications device, a hospital device, a gaming device or system, an entertainment system, a vehicle computer system, an embedded system controller, a remote control, an appliance, a consumer electronic device, a workstation, an edge device, any combination of these delineated devices, or any other suitable device.

The disclosure may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. The disclosure may be practiced in a variety of system configurations, including hand-held devices, consumer electronics, general-purpose computers, more specialty computing devices, etc. The disclosure may also be practiced in distributed computing environments where tasks are performed by remote-processing devices that are linked through a communications network.

As used herein, a recitation of "and/or" with respect to two or more elements should be interpreted to mean only one element, or a combination of elements. For example, "element A, element B, and/or element C" may include only element A, only element B, only element C, element A and element B, element A and element C, element B and element C, or elements A, B, and C. In addition, "at least one of element A or element B" may include at least one of element A, at least one of element B, or at least one of element A and at least one of element B. Further, "at least one of element A and element B" may include at least one of element A, at least one of element B, or at least one of element A and at least one of element B.

The subject matter of the present disclosure is described with specificity herein to meet statutory requirements. However, the description itself is not intended to limit the scope of this disclosure. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

What is claimed is:

1. A method comprising:
generating one or more first motion vectors mapping first visual content displayed at one or more first pixel locations in a first reference frame of a sequence of frames to one or more pixel locations in an intermediate frame;
generating one or more second motion vectors mapping second visual content displayed at one or more second pixel locations in a second reference frame of the sequence of frames to the one or more pixel locations in the intermediate frame;
detecting, based at least on the first visual content and the second visual content, a conflict between the one or more first motion vectors and the one or more second motion vectors at least one pixel location of the one or more pixel locations in the intermediate frame; and
responsive to the detecting, generating pixel data for the at least one pixel location in the intermediate frame using at least one motion vector of the one or more first motion vectors based at least on the one or more first motion vectors having a greater similarity to a global motion vector than the one or more second motion vectors.

2. The method of claim 1, wherein the generating the pixel data is based at least on one or more of interpolating the pixel data between the first reference frame and the second reference frame or extrapolating the pixel data from one or more of the first reference frame or the second reference frame.

3. The method of claim 1, wherein the detecting the conflict is based at least on the one or more first motion vectors indicating at least a portion of a first surface depicted in the first reference frame and the second reference frame is in front of a second surface that is depicted in the first reference frame and the second reference frame and is different than the first surface, and the one or more second motion vectors indicating the at least a portion of the first surface is behind the second surface.

4. The method of claim 1, further comprising computing a similarity score indicating the greater similarity based at least on one or more of:
 a difference between an angle of the global motion vector and one or more angles of the one or more first motion vectors; or
 a difference between a magnitude of the global motion vector and one or more magnitudes of the one or more first motion vectors.

5. The method of claim 1, wherein the generating the pixel data is to generate one or more additional frames for the sequence of frames to achieve a target framerate when displayed using a display device for one or more periods of time.

6. The method of claim 1, wherein the generating is based at least on computing a similarity metric that weights a difference between an angle of the global motion vector and one or more angles of the one or more first motion vectors in proportion to a magnitude of the global motion vector.

7. The method of claim 1, wherein the generating is based at least on:
 computing a first similarity score for the one or more first motion vectors;
 computing a second similarity score for the one or more second motion vectors; and
 comparing the first similarity score to the second similarity score.

8. The method of claim 1, wherein the global motion vector is computed using a statistical combination of motion vectors between the first reference frame and the second reference frame.

9. The method of claim 1, wherein the pixel data for the at least one pixel location does not correspond to the second visual content based at least on the one or more first motion vectors having the greater similarity.

10. A system comprising:
 one or more processing units to perform operations comprising:
  generating, based at least on an optical flow between a first reference frame and a second reference frame, a first motion vector mapping first visual content of the first reference frame to a pixel location in an intermediate frame and a second motion vector mapping second visual content of the second reference frame to the pixel location in the intermediate frame;
  determining, based at least on the first visual content and the second visual content, a conflict between the first motion vector and the second motion vector at the pixel location; and
  generating pixel data corresponding to the pixel location using the first motion vector based at least on the first motion vector having a greater similarity to a global motion vector than the second motion vector.

11. The system of claim 10, wherein the generating the pixel data is based at least on one or more of interpolating the pixel data between the first reference frame and the second reference frame or extrapolating the pixel data from one or more of the first reference frame or the second reference frame.

12. The system of claim 10, wherein the determining the conflict is based at least on the first motion vector indicating at least a portion of a first surface is in front of a second surface that is different than the first surface at the pixel location, and the second motion vector indicating the at least a portion of the first surface is behind the second surface at the pixel location.

13. The system of claim 10, further comprising determining the first motion vector has a greater similarity to the global motion vector than the second motion vector based at least on computing one or more of:
 a difference between a first angle of the global motion vector and a second angle of the first motion vector; or
 a difference between a first magnitude of the global motion vector and a second magnitude of the first motion vector.

14. The system of claim 10, wherein the system is comprised in at least one of:
 a control system for an autonomous or semi-autonomous machine;
 a perception system for an autonomous or semi-autonomous machine;
 a system for performing simulation operations;
 a system for performing digital twin operations;
 a system for performing light transport simulation;
 a system for performing collaborative content creation for 3D assets;
 a system for performing deep learning operations;
 a system implemented using an edge device;
 a system implemented using a robot;
 a system for performing conversational AI operations;
 a system for generating synthetic data;
 a system for presenting at least one of virtual reality content, augmented reality content, or mixed reality content;
 a system incorporating one or more virtual machines (VMs);
 a system implemented at least partially in a data center; or
 a system implemented at least partially using cloud computing resources.

15. At least one processor comprising:
 one or more circuits to determine pixel data corresponding to at least one location of an intermediate frame using one or more first motion vectors mapping one or more first frames to the at least one location, the pixel data determined based at least on:
  a determination of a conflict at the at least one location between the one or more first motion vectors and one or more second motion vectors mapping one or more second frames to the at least one location in the intermediate frame, and
  a determination the one or more second motion vectors are less similar to one or more global motion vectors than the one or more first motion vectors.

16. The at least one processor of claim 15, wherein the one or more global motion vectors correspond to motion for one or more overall frames.

17. The at least one processor of claim 15, wherein the intermediated frame is generated, at least, by interpolating the pixel data between a first frame of the one or more first frames and a second frame of the one or more second frames.

18. The at least one processor of claim 15, wherein the conflict corresponds to a pixel collision in the intermediate frame between the one or more first motion vectors and the one or more second motion vectors.

19. The at least one processor of claim 15, wherein the determination the one or more second motion vectors are less similar to the one or more global motion vectors than the one or more first motion vectors is based at least on one or more of:
- a difference between one or more first angles of the one or more global motion vectors and one or more second angles of the one or more first motion vectors; or
- a difference between one or more first magnitudes of the one or more global motion vectors and one or more second magnitudes of the one or more first motion vectors.

20. The at least one processor of claim 15, wherein the processor is comprised in at least one of:
- a control system for an autonomous or semi-autonomous machine;
- a perception system for an autonomous or semi-autonomous machine;
- a system for performing simulation operations;
- a system for performing digital twin operations;
- a system for performing light transport simulation;
- a system for performing collaborative content creation for 3D assets;
- a system for performing deep learning operations;
- a system implemented using an edge device;
- a system implemented using a robot;
- a system for performing conversational AI operations;
- a system for generating synthetic data;
- a system for presenting at least one of virtual reality content, augmented reality content, or mixed reality content;
- a system incorporating one or more virtual machines (VMs);
- a system implemented at least partially in a data center; or
- a system implemented at least partially using cloud computing resources.

* * * * *